(12) United States Patent
Zakiewicz (10) Patent No.: US 6,627,680 B2
(45) Date of Patent: Sep. 30, 2003

(54) MATRIX OF MELTABLE MINERALS AND FERTILIZERS

(76) Inventor: Bohdan Zakiewicz, 427 14th St., Santa Monica, CA (US) 90402

( * ) Notice: Subject to any disclaimer, the term of this patent is extended or adjusted under 35 U.S.C. 154(b) by 0 days.

(21) Appl. No.: 09/832,690

(22) Filed: Apr. 11, 2001

(65) Prior Publication Data

US 2002/0151621 A1 Oct. 17, 2002

(51) Int. Cl.⁷ .................................................. C08K 3/00
(52) U.S. Cl. .................... 523/207; 423/567.1; 423/524; 524/80
(58) Field of Search ........................... 523/207; 524/80; 423/567.1

(56) References Cited

U.S. PATENT DOCUMENTS

| | | | |
|---|---|---|---|
| 4,058,500 A | | 11/1977 | Vroom |
| 4,290,816 A | | 9/1981 | Ludwig et al. |
| 4,387,167 A | | 7/1983 | Kidwell, Jr. et al. |
| 4,406,706 A | * | 9/1983 | Dale ........................... 106/288 |
| 4,426,456 A | * | 1/1984 | Gillott ........................... 501/84 |
| 4,475,953 A | | 10/1984 | Ludwig et al. |
| 5,169,647 A | * | 12/1992 | Young ........................ 424/702 |
| 5,371,121 A | * | 12/1994 | Bellomy ...................... 524/68 |
| 5,935,313 A | | 8/1999 | Ficinski |

* cited by examiner

*Primary Examiner*—Edward J. Cain (57) ABSTRACT

The present invention are methods for and products having an elemental sulfur matrix. The matrix is formed by using an amount of shear force on molten elemental sulfur, where the molten sulfur is combined with a matrix forming material.

20 Claims, 9 Drawing Sheets

MATRIX OF MELTABLE MINERALS AND FERTILIZERS

BACKGROUND OF THE INVENTION

The present invention relates to materials having a substantial elemental sulfur matrix.

U.S. Pat. Nos. 5,935,313, 4,475,953, 4,290,816, 4,387,167 and 4,058,500 disclose certain sulfur compositions and their methods of formation. There is a need for a sulfur composition with improved compressive strength and/or a foamed sulfur structural or agricultural use product.

SUMMARY OF THE INVENTION

The present invention are methods for and products having an elemental sulfur matrix. The matrix is formed by using at least a minimum amount of shear force on molten elemental sulfur, in either a relatively pure or less pure form, where the molten sulfur is combined with materials causing nucleation, coalescence, colloidallization, and/or pore formation.

The present invention forms material with improved compressive and tensile strength, durability, elasticity, flammability, thermal conductivity, thermal expansion, adhesivity, permeability, radioactive attenuation, chemical and toxic material resistance and/or non toxic foaming.

Pore formation is the result of injecting gases or vaporizable liquids as materials combined with the molten sulfur.

The nucleating material comprises virtually any material solid at the processing temperature that is sufficiently small enough to obtain the objects of the invention or is broken into such small pieces that the objects are obtained. The coalescing material is a liquid or meltable solid fed into the molten sulfur while under the shear force. Gases or vaporizing material are introduced at the point of shear stress to mix with molten sulfur so that relatively small bubbles are formed, producing a lightweight product with great structural strength.

The present invention is a method of changing the previously known crystalline mineral structure of meltable materials into a solid or porous amorphous matrix, more particularly for forming new, durable structural materials or a porous matrix capable of releasing fertilizer nutrients in contact with biochemical environment in soils.

The present invention is also a method of using a substantial proportion of unprocessed crude or recovered waste sulfur or sulfur impregnated rock that can be combined with other materials to form the above novel matrices. The sulfur matrix can be formed with micronized wollastonite, limestones, silica and silicates, urea, clays, borax salts, phosphates, asphalts, bitumens, tars, resins, rubbers, coals, lignites, peats, caoutchouc, paraffins, iso-paraffins, vinyls, poly-uretans, micronized oxides of lead, iron, barite, fly ash, furnace slag, ceramics of various kind, mineral or glass or carbon or steel or asbestos or combination of the said fibers, wooden chips and sawdust, straws, paper pulp.

The term "crude sulfur" refers to unprocessed or unrefined sulfur containing more than 25% of elemental sulfur per weight, including calcium carbonate in natural sulfur ore body, sulfur impregnated volcanogenic silicates, sulfur from fumarols, non-purified sulfur from oil gas and metals purification processes, waste sulfur from vulcanization processes, and other such less pure sulfur forms. Pure or solid sulfur refers to crystalline or micro-crystalline sulfur as purified apart from other components or as the elemental sulfur portion of the less pure forms.

Solid sulfur has very low heat transfer coefficient under very large temperature gradients and is nonconductive, unless combined with conductive carbon. However, its use as a structural material and as a chemical release matrix are virtually unknown in commercial practice because of solid sulfur's the lack of structural integrity or the relatively high cost or complexity of the alternatives. Solid, crystalline sulfur, while rigid, is quite brittle and non-uniform in crystalline structure.

The invention product sulfur matrix or amorphous crystal structure is formed upon exposure to shear stress in the presence of one or more of the matrix forming materials and subsequent solidification. Re-melting and resolidification appear not to affect matrix re-formation to give substantially the same product properties. The relatively intense mixing of the invention distributes the matrix forming materials substantially uniformly throughout the melt such distribution is advantageously maintained regardless of re-melting.

The process of the present invention is the substantially even distribution of nucleating material and/or coalescing material within a molten sulfur so that solidification creates a matrix which has structural integrity for structural members or chemical and/or moisture release of desirable nutrients, such as are used in agriculture and in one preferred embodiment as fertilizer.

The present invention comprises using mineral, metal, polymer, elemental, fiber or any such particles that do not melt at processing temperatures as nucleating materials. Nucleating materials are preferably about 100 microns or less in size and comprise such matter as wollastonite, limestones, silica and silicates, clays, borax salts, phosphates, humic acid, coals, lignites, peats, oxides of lead, iron, barite, fly ash, furnace slag, ceramics of various kind, mineral or glass or carbon or steel or asbestos or combination of the said fibers, wooden chips and sawdust, straws, paper pulp, chromium salts, depleted uranium. While one embodiment comprises using particles at the desired size for mixture with the molten sulfur, another embodiment permits particles of substantial size that are ground to a desired size in the processing equipment generating the shear stress for mixing the nucleating materials.

Coalescing materials substantially enhance the nucleation effect of nucleation material mixing in the molten sulfur. The following are preferable coalescing materials in a liquid or meltable form, i.e., meltable at processing conditions: urea, asphalts, bitumens, tars, resins, rubbers, caoutchouc, paraffins, iso-paraffins, vinyls, polyurethanes. Although adequate nucleation is achieved without the coalescing material for the objects of the present invention, coalescing materials can reduce the processing time required for obtaining the desired final product properties.

DETAILED DESCRIPTION OF THE INVENTION

The present invention makes a product from molten sulfur and matrix formation material or materials that result in a substantially uniform microcrystalline structure in the solidified product. The nucleation material can be silica (glass, sand, dust or products derived from such materials), asbestos or other such mineral fibers, metal oxides, fly ash or other solid particles, which may be partially reactive with the liquid sulfur. The coalescing material is preferably of two classes, a first class of liquids that do not form gas in the mixing chamber and a second class of gases and liquids that form gas-produced matrix pores in the material solidified from the mixing chamber liquid. The first class of coalescing materials preferably includes urea, asphalts, bitumens, tars, resins, rubbers, waxes, doubly unsaturated branched hydrocarbons, monomeric isoprene-terpines, monoterpines, polyterpenes, pinenes, caoutchouc, paraffins, iso-paraffins, vinyls, poly-uretans, which, in addition to their physical mixing in the sulfur, may chemically react with the sulfur or other components in the mixing chamber. The coalescing material may be associated with the common liquid or solid deodorizers, not influencing neither nucleation nor coalescing processes.

The second class of coalescing materials includes air and its components, such as nitrogen, oxygen, carbon dioxide and inert or reactive gases, 1 to 4 carbon hydrocarbons, or such materials will vaporize at above about 100 degrees C. at above about 2 bars in the invention processing conditions. The second class of coalescing materials also includes gases having components reactive with one or more of the sulfur forms of liquid sulfur.

Figure 6:
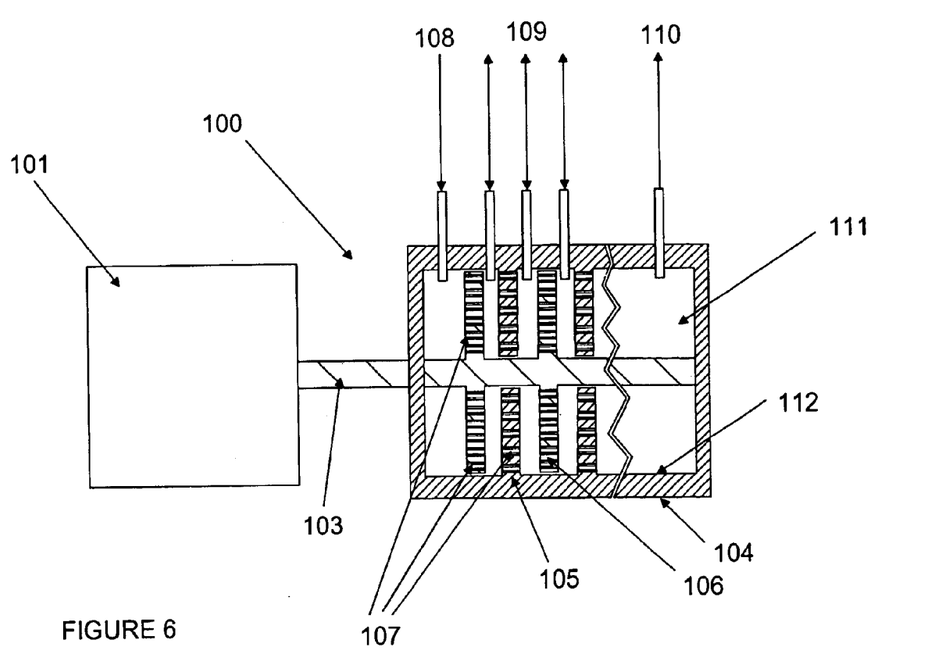
FIG. 6 is exemplary of a class of devices used for inducing shear stress in the invention sulfur mixtures. The view is a cutaway side section through the rotating shaft axis showing the shaft and hole pierced disks sealingly engaging the chamber walls and the fixed disks sealingly engaging the rotating shaft.
Figure 6A:
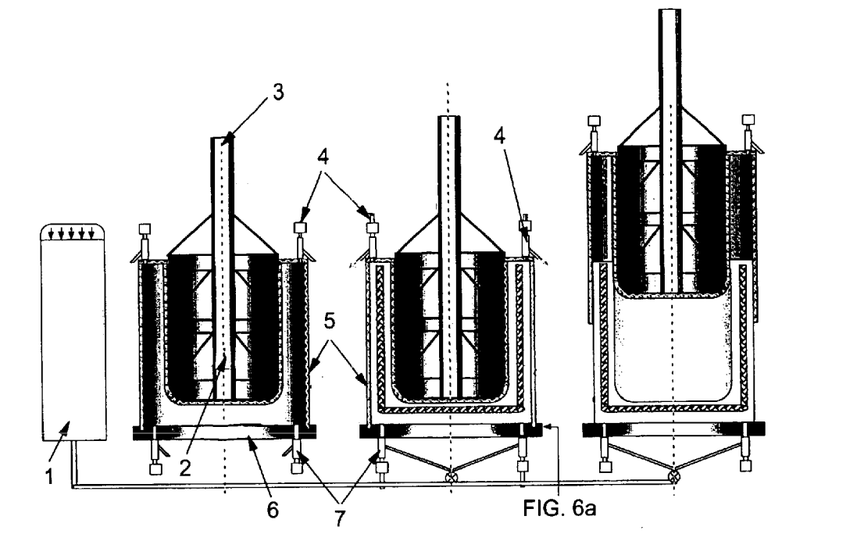
FIGS. 6a–c and 7–9 are cross section series of steps showing fabrication of structures using the non-foamed invention sulfur composition.
Figure 6B:
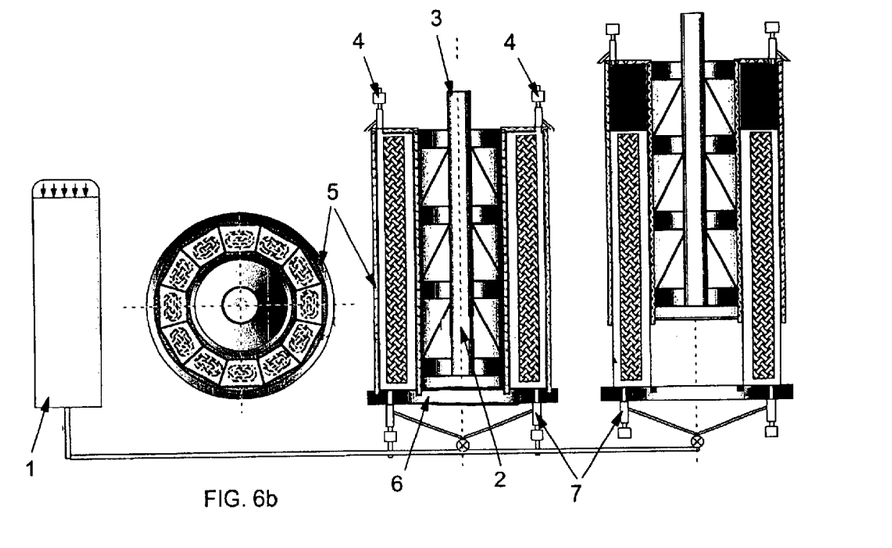
Figure 6C:
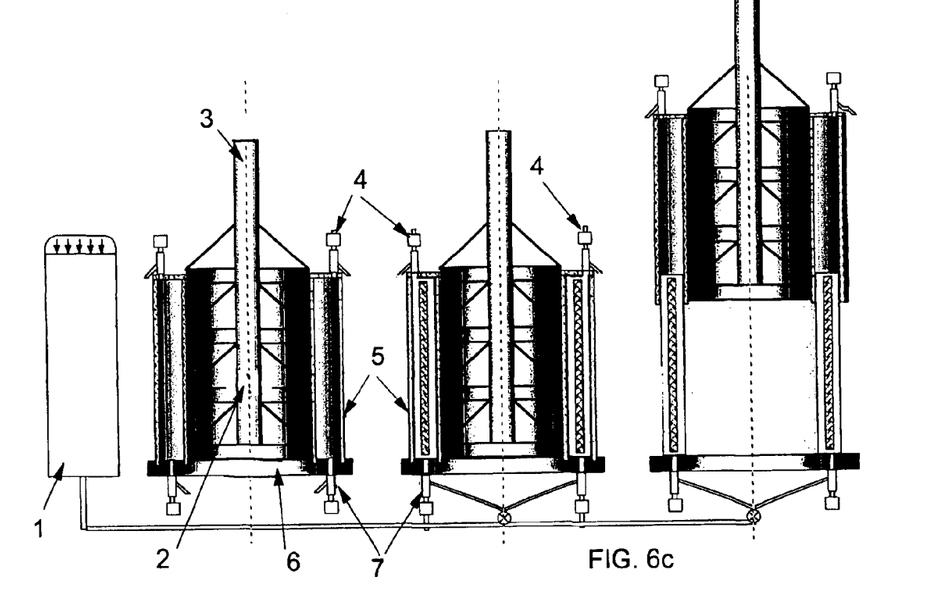
Figure 7:
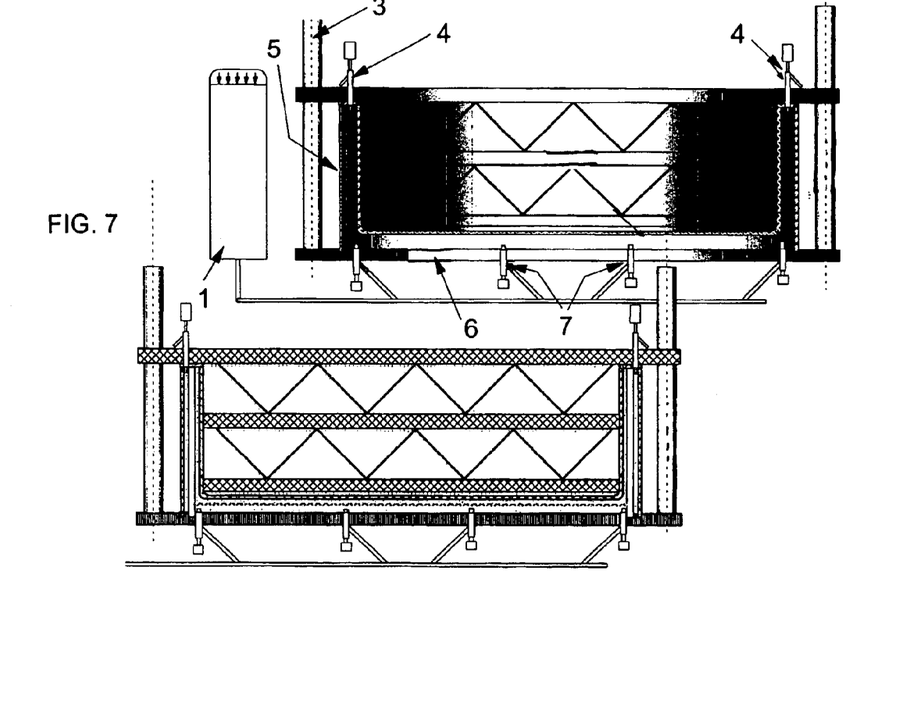

The high shear inducing devices for processing of the sulfur mixture can be chosen from among disintegrators, ball mills, emulsion or colloid mills, in-line turbines, high energy homogenizer, the device of FIG. 6 or the like which can bring about an effective rotating velocity of the rotor to stator surface shear stress or force of about 15–35 or more meters per second, a shear rate of 50,000 to 190,000 sec−1, shear stress of between 40 to 140,000 or more kg per square meter, where a preferred space between the stator and rotor surfaces is effectively about 20–150 microns, although actual clearance can be up to 200 microns. The shear stress thereby applied is disclosed in specific examples below.

Figure 1:
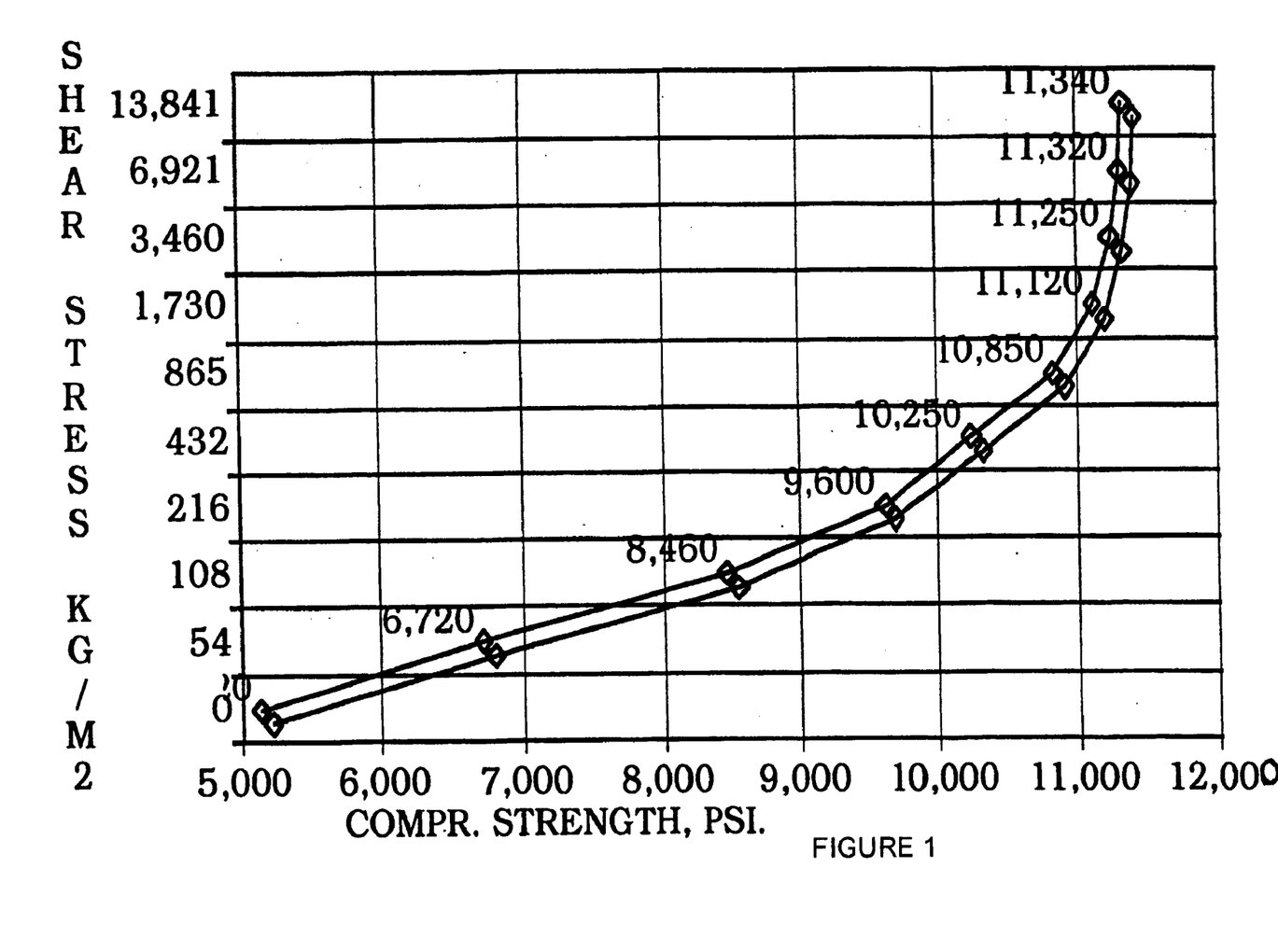
FIG. 1 is a graph showing increasing compressive strength on application of increasing shear stress to a mixture of molten sulfur and coalescing material without nucleating materials.

EXAMPLE OF FIG. 1

The following example is described with reference to FIG. 1. The material shown as tested in FIG. 1 was formed from molten sulfur combined with coalescing material. This mixture at an appropriate temperature minimizing viscosity for substantially pure sulfur (i.e., about 110 C to about 155 C, but preferably within about 130 C to 135 C) was injected at 1.5–6 bar (preferably 3–4 bar) into an appropriate compounder or disintegrator, as shown in FIG. 6 or otherwise appropriate for the invention objects for high shear mixing. The coalescent material is one of several liquids for effecting the objects of the invention. The inventor has found that for a non-foamed class of invention products a broad range of hydrocarbon liquids not volatile at processing temperatures will be effective as coalescing mateials, such as paraffinic, aromatic, naphthenic, and/or olefinic hydrocarbons. Coalescing materials for this class also include organic acids and bases as solids or liquids that are liquid at processing temperatures such as phosphoric acid, urea, bentonite, humic acid, and the like comprising a class of agricultural nutrients. For the examples of FIGS. 1 and 2, the effluent 110 of FIG. 6 leaving the compounder was recycled to a holding tank at below atmospheric pressure maintained at processing temperatures. In a preferred mode of operating, the contents of the holding tank were recycled 2 to 3 times through the compounder to obtain a desired amount of residence time in the mixing chamber to reduce the size of the compounder. The final product was removed from the holding tank and allowed to cool in a mold of a preferred shape. Since the non-foamed invention composition material may be maintained in the molten state until needed for use molten, any structural product which may be formed from mold filling of a polymeric, cementitious and/or asphaltic material may be similarly formed with the molten, non-foamed invention material. Similarly, such products formed in the prior art by foamed structural materials by be formed by mold filling or pelletizing with the foamed invention composition material.

In a more specific example, coalescing material of a liquid naphthenic or aromatic hydrocarbon with components having 6 or more carbons was combined with molten sulfur at a temperature of 132 C such that the resulting mixture was 3 to 10 weight percent coalescing material. The mixture was introduced at about 3 bars to an inlet 108 as in compounder 100 of FIG. 6, the compounder 100 having 6 or more rotating disks 106 fixed on shaft 103 as shear rotors and interleaved with stator disks 105, of the disks having holes 107 of about 0.25 to 0.50 inches such that the flow of the mixture is forced through the hole of a rotating rotor disk and then through a hole of a fixed stator disk.

For the compounder of FIG. 6, motor 101 controls the speed of shaft 103 to about 20,000 to 23,000 rpm for this example. Shell 104 is cylindrical having a mixing chamber 111 and inside surface 112, preferably having a heating jacket for heating the contents of chamber 111 to about the temperature of the mixture entering at inlet 108. Stator disks 105 extend from surface 112 substantially sealingly to shaft 103. Rotating disks 106 extend from shaft 103 substantially sealingly to inside surface 112. The substantial sealing interfaces prevent fluid bypassing of the rotor and stator. It will be clear to the skilled person that this function generating the shear stress shown in the results of FIGS. 1–5 for the invention mixture may be obtained in many prior art devices such as those disclosed above. The products of FIGS. 1–5 were produced with a compounder of about 25 gpm capacity, although scale up is relatively easy to do. The examples of FIGS. 1–5 describe a product subjected to a shear stress of at least 50 kg per $m^2$.

FIG. 1 shows the averaged results of 90 samples of the invention products.

There is a strong correlation between process shear stress applied in the above compounders for at least about more than 0.25 seconds of residence time in the mixing chamber. For the range of shear stress between 54 to 13,841 kg per $m^2$, the compression strength of the resulting cooled and solidified product poured in to a rectangular mold was increased from 5,120 psi with a very low shear stress applied to 11,340 psi with a substantially high shear stress applied. The shear stress may be varied in compounders in a manner well known in the art with this disclosure, i.e., by changing speed, changing rotor to stator clearance and/or changing rotor to stator geometry or orientation. The present invention extends to minimum application of shear stress in many prior art and invention devices.

The results of FIG. 1 show that compression strength measured by psi in the solidified product increases about one percent with an average increase of shear stress by about 200 kg per $m^2$. It appears the most cost efficient operation range for generating the objects of the present invention for this example for FIG. 1 is within a shear stress 54 to 1,730 kg per $m^2$, where each one percent increase in compression strength requires an applied shear stress of about 45 kg per $m^2$.

Figure 2:
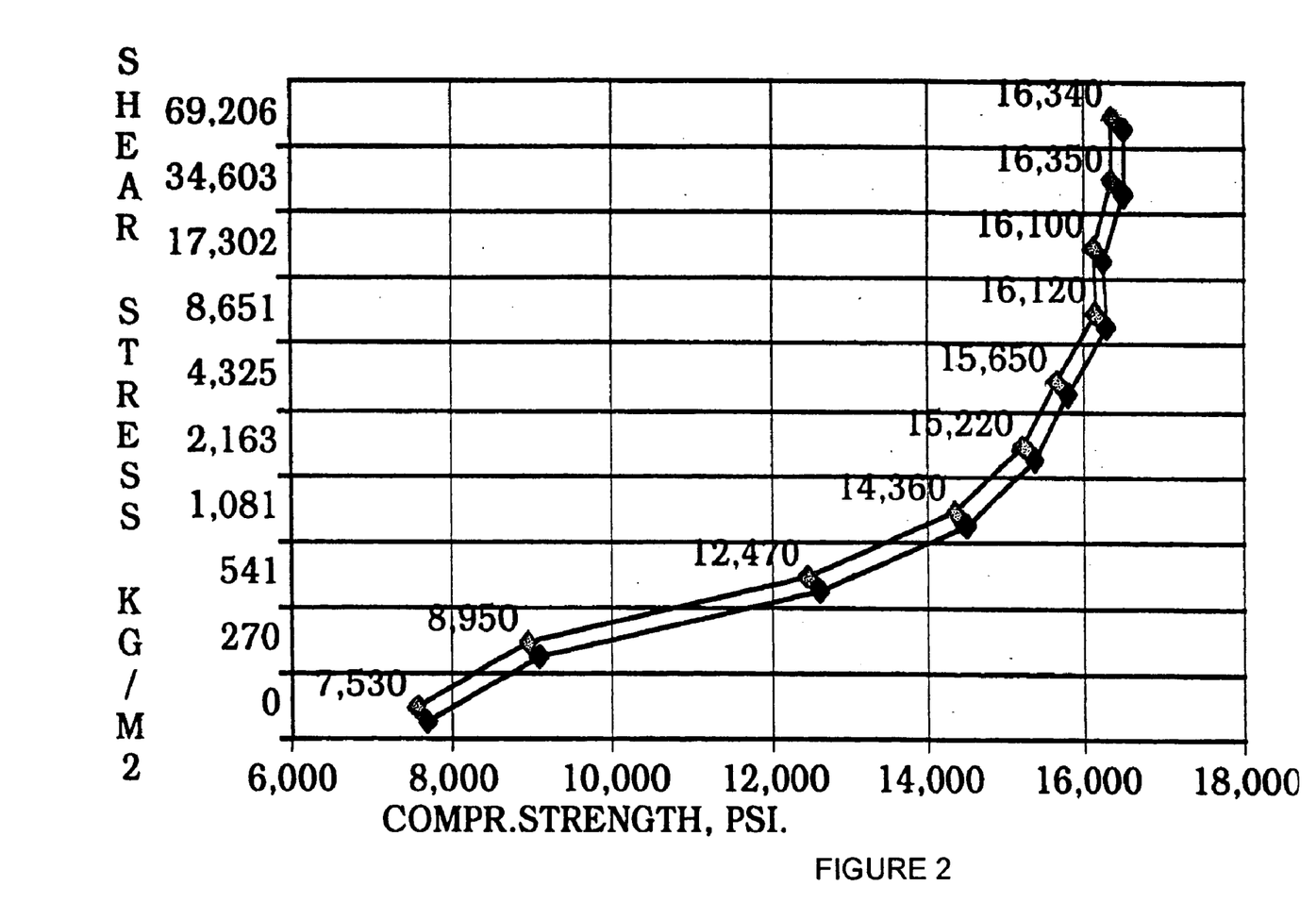
FIG. 2 is a graph showing increasing compressive strength on application of increasing shear stress to a mixture of molten sulfur and nucleating material without coalescing materials.

EXAMPLE OF FIG. 2

The following example is described with reference to FIG. 2, which shows the applied shear stress for an invention mixture processed under the same conditions as those for the example for FIG. 1. The material shown as tested in FIG. 2 was formed from molten sulfur at about 132° C. combined with silica, mineral, metal or other such non-melting particulate fines. More specifically, the mixture was about 40 weight percent furnace slag (about 200 mesh) and 35 weight percent mineral fiber with the balance in molten sulfur. The present inventor has found that a fines content as little as 3 weight percent to 80 weight percent are capable of forming a usable product having at substantial improved compression strength properties of the invention.

For applied shear stress between 270 to 69,206 kg per $m^2$, the compression strength in the resulting solidified product increased from 7,530 PSI to 16,340 PSI. On the average, each increment of one percent improvement in compression strength was accomplished with an increase of applied shear stress of about 600 kg per $m^2$. A most efficient range for obtaining products after application of applied shear stress is between 270 to 16,120 kg per $m^2$, where one percent improvement in compression strength was on the average accomplished with an increase of applied shear stress of about 76 kg per $m^2$.

Figure 3:
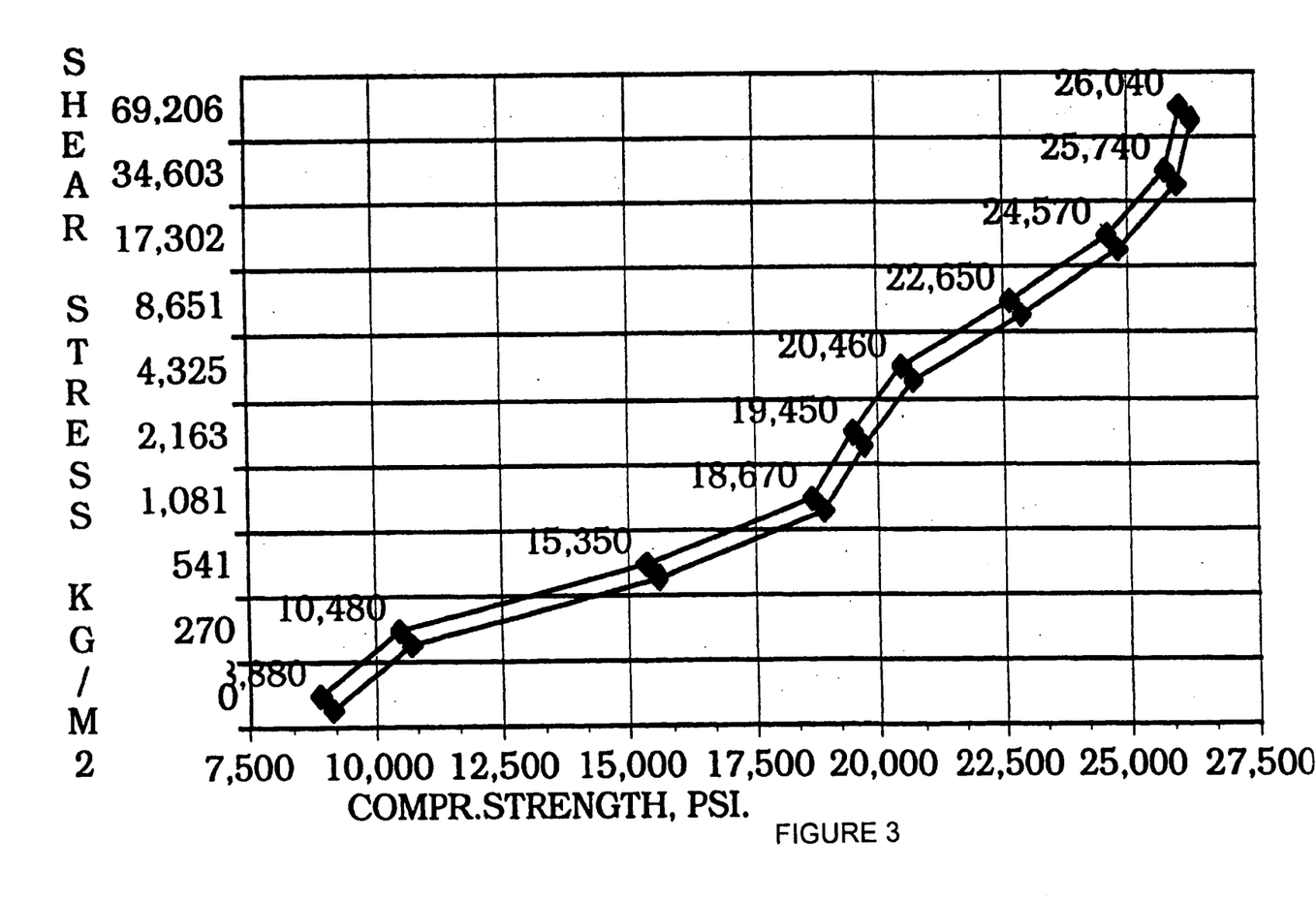
FIG. 3 is a graph showing increasing compressive strength on application of increasing shear stress to a mixture of molten sulfur and nucleating material without coalescing materials as in FIG. 2 although with solidification at constant pressure.

EXAMPLE OF FIG. 3

The following example is described with reference to FIG. 3, which shows the applied shear stress for an invention mixture processed under the same conditions as those for the example for FIG. 1 with the composition and conditions of the example of FIG. 2. However, for this example a constant pressure of about 3 bars was maintained as the molten mixture was recycled through the compounder. It appears that such constant pressure improves mid-range compression strength of the solidified product at a lower applied shear stress. For the range of shear stress between 270 to 69,206 kg/$m^2$, the compression strength increased from 8,680 psi to 26,040 psi. For the range of shear stress between 270 to 34,603 kg per $m^2$, an increase of one percent of compression strength requires an increase of shear stress of 180 kg per $m^2$

Figure 4:
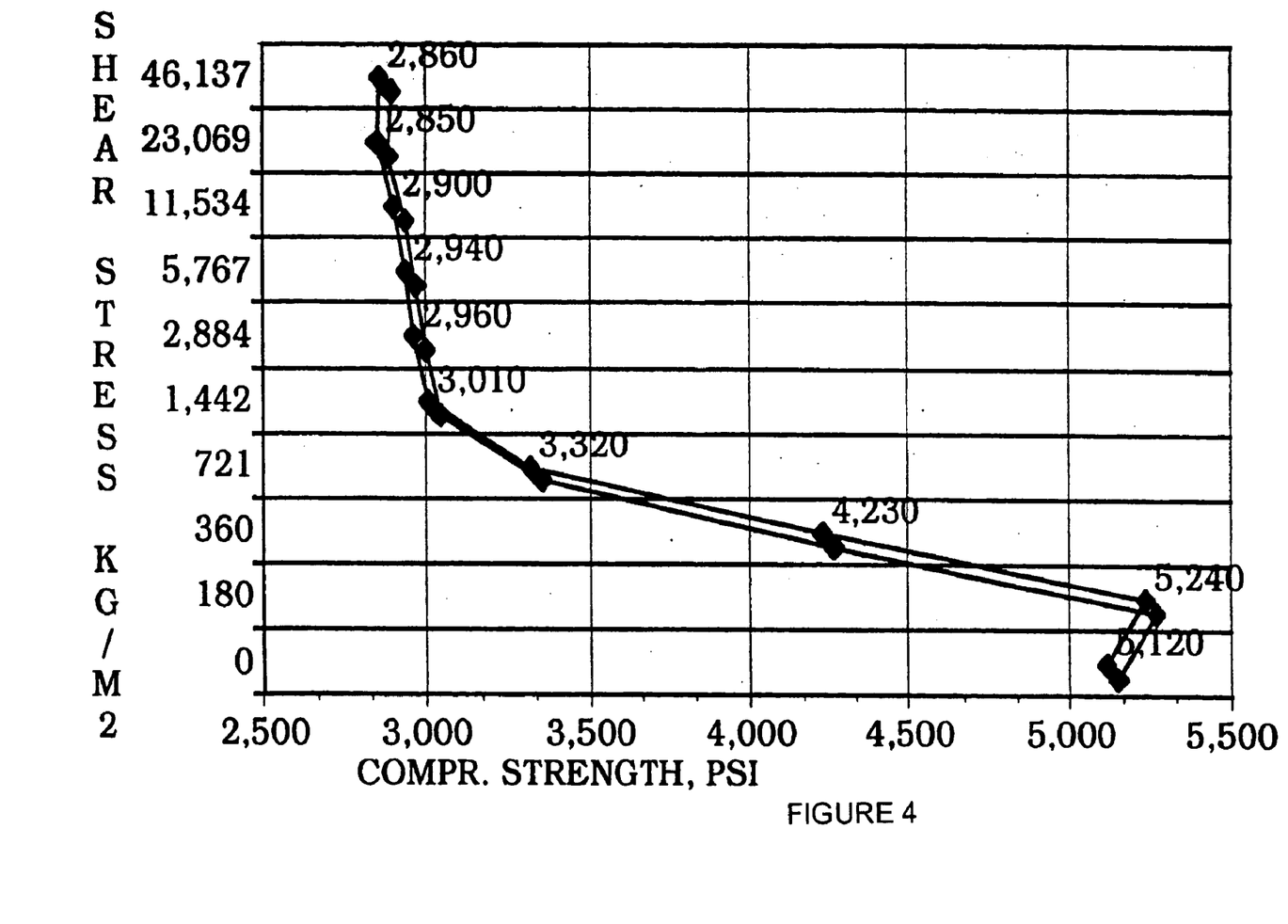
FIG. 4 is a graph showing decreasing compressive strength on application of increasing shear stress to a mixture of molten sulfur and gas forming coalescing material without nucleating materials.
Figure 5:
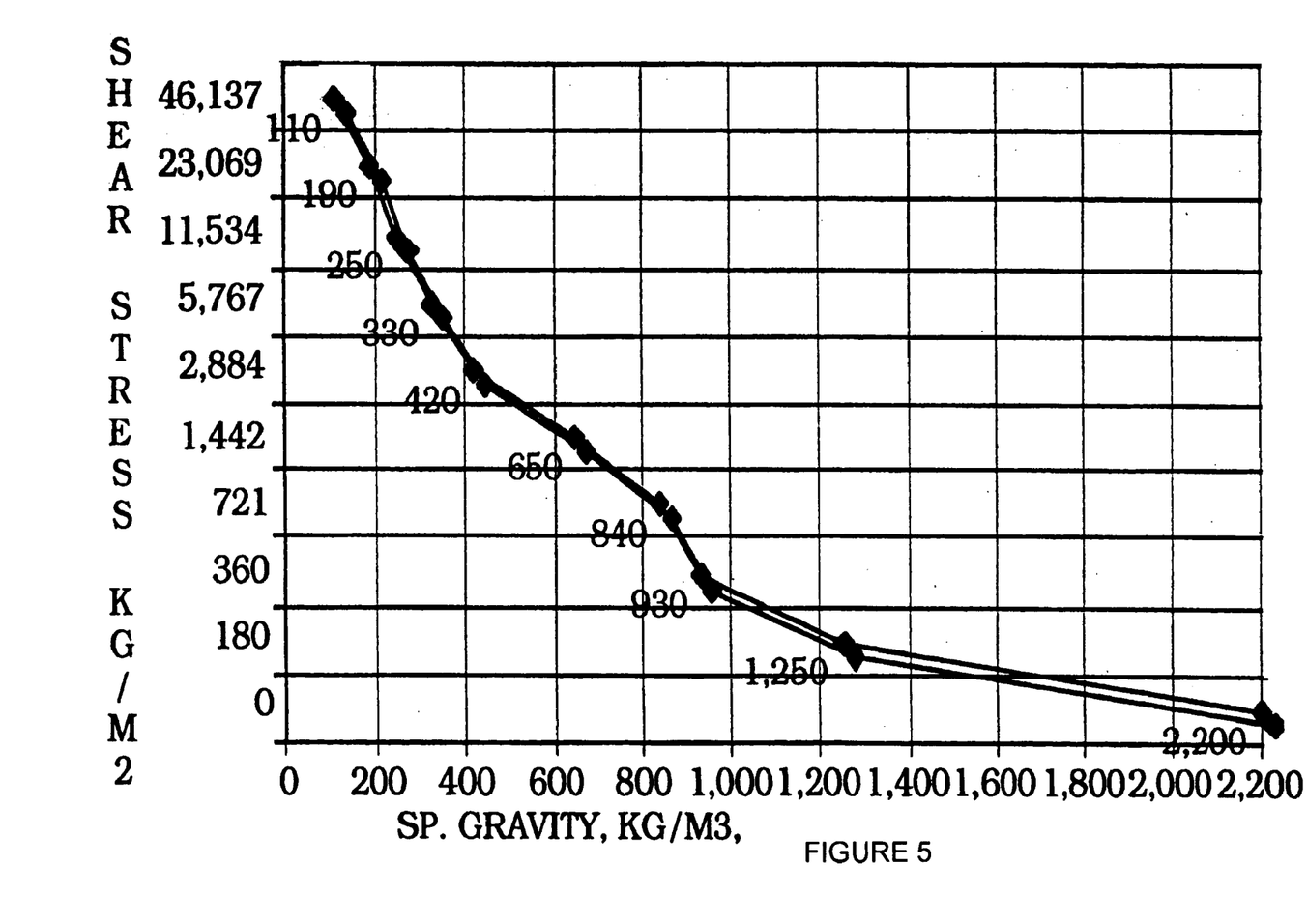
FIG. 5 is a graph showing decreasing specific gravity on application of increasing shear stress to a mixture of molten sulfur and gas forming coalescing material without nucleating materials as in FIG. 4.

EXAMPLE OF FIGS. 4 AND 5

The following example is described with reference to FIG. 4, which shows the applied shear stress for an invention mixture processed under the same conditions as those for the example for FIG. 1, although using gaseous or gas forming coalescing material instead of a liquid or meltable coalescing material, so that the product of this example is a second class of products with coalescing material, i.e., a foamed product. This specific example used carbon dioxide as the coalescing material in the ratio of about 9 parts by volume CO2 to one part by volume molten sulfur. Only a single pass through the compounder is used for foamed products as disclosed under this example. An effluent 110 as in FIG. 6 is obtained by injecting CO2 into inlet/outlet conduits 109 or with the molten sulfur at inlet 108 so that the coalescing material is introduced under shear stress conditions with the molten sulfur. It is preferred that the CO2 be introduced as closely to the first shear stress rotor/stator interface as possible, although the several injection locations shown in FIG. 6 for inlet/outlet conduits 109 indicate that the gaseous or gas forming coalescing material may be introduced at locations more distal to such a first interface. It is preferable that the gas be formed in the mixing chamber mixture be at least about 50 volume percent of the total mixture.

Effluent 110 for this example was solidified at a pressure of about 1.5 bars. The procedure of testing and data selecting was similar to Series 1.

The results shown in FIG. 4 demonstrate that the foamed product is extremely useful for forming a wide range of rigid foamed products with a sulfur matrix. With the exception of applied shear stress less than about 180 kg per $m^2$ there is an inverse relation between applied shear stress and compression strength. The inventor speculates that the increasing shear stress causes reduction in bubble size in the resulting cooled product, which typically in other rigid foams would cause improvement in compression strength. In the case of foamed sulfur products the reverse appears to be true. The inventor has found that a maximum compression strength sulfur foamed product must be intimately mixed with devices causing the disclosed shear stress while keeping the shear stress at about below 200 kg per $m^2$. FIG. 5 shows the corresponding reduction in specific gravity of the solidified product with increasing shear stress. Apparently a smaller bubble size evenly distributed by the higher shear stress results in a dramatically lighter product at the sacrifice of compression strength.

In FIG. 5, for the range of shear stress between 180 to 46,137 kg per $m^2$, the specific gravity decreased from 2,200 to 110 kg per $m^3$. This skilled person with present disclosure now has access to a relatively light foamed sulfur product. The following description describes some of the products that may be preferably formed thereby.

While compression is typically maximized in rigid foamed structural products, lightweight agricultural products according to the invention with reduced compression strength may comprise pastilles, pellets or spheres that have previously unknown properties as fertilizer and/or nutrient bearing capabilities. The molten sulfur mixture to be foamed in this example may comprise substantial amounts of phosphates, urea, humic acid and other inorganic or organic nutrients. It has been found that products formed into small spherical pieces with such a composition and having a specific gravity less than about 1000 kg per $m^3$ have great utility as long lasting (greater than two growing seasons) as slowly dissolving fertilizer carriers. Due to the intense shear stress induced among the nutrients, sulfur and gaseous or gas inducing coalescing materials, the resulting composition prevents early moisture or soil chemistry induced early leaching of the nutrients out of the matrix. High solubility nutrients are excessively applied to the soil of virtually all crops because no long lasting carrier as described herein has been previously developed. The dissolution of the high solubility nutrients, even in prior art low solubility carriers, has resulting in a washing away of the nutrients from the soil between growing seasons. The present invention includes meltable or particulate nutrients mixed at the disclosed shear stress conditions to obtain a long life carrier for high solubility nutrients.

The compression strength, with increasing the shear stress and of the time of gas

STRUCTURAL EXAMPLES

FIGS. 6a–c and 7 show a "capping form" as vertical crossections of three stages of the forming process of nuclear waste containers, rail-road ties and large diameter sewage pipes. The Capping Form can be cylindrical (FIGS. 6a, 6b, 6c) or rectangular (FIG. 7) and has two parts: the upper (2), which is liftable and lowerable to seal with base (6) under hydraulic pressure developed by hydraulic press (3), and lower part (6), which is a platform base equipped with lower ramming type valves, inlet of injection of the material and sealing groove with sealing gasket. In a first step, the capping part of the form is lowered and locked with seal in the base, after reinforcing basket or rebarring system are inserted into forming chamber. The circulated oil to heat double wall blanket is applied.

In a second step, the molten invention product of examples of FIG. 1 or 2 is injected by shotcrete mechanism (1) or by pump which develops a upwardly flow of molten material from the base into space between heated double walls. During injection the ramming valves (4) and (7) are open to allow the material to fill the chamber and to over flow at the top of the form through valves (4). Thereafter upper valves (4) are closed for overflow, and lower ramming valves (7) are cutting off injection stream into chamber. Subsequently the all ramming valves are developing a hydraulic pressure by maintaining the cylindrical pistons in the active-moving mode under pressing mechanism. The hydraulic pressure is maintain until solidification will occur and forming process completed.

In a third step, the capping part of the form is lifted up and product can be removed (rolled-over) from the base platform (6).

Figure 8:
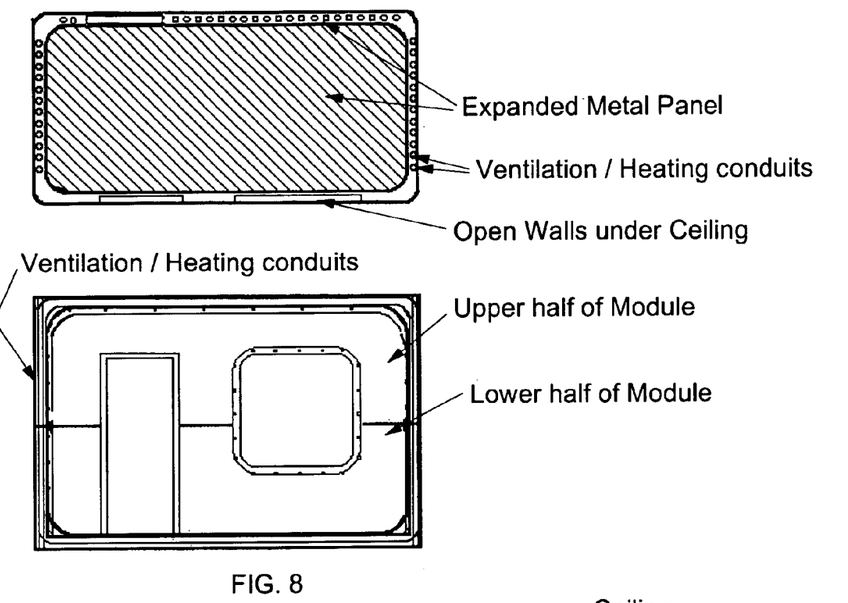
Figure 9:
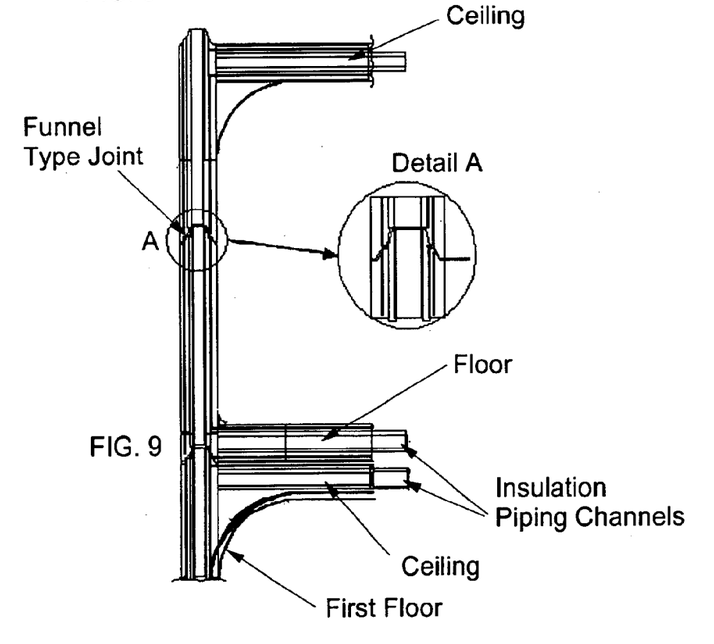

With respect to the structures of and methods of forming them in FIGS. 8 and 9, FIG. 8 is horizontal view of the upper halve of a shell constituting a module of the prefabricated affordable housing structure with incasing tubular ventilation-convective air-conditioning system. In the lower part the vertical view of the one of the wall is demonstrated.

In FIG. 9 the more detailed crossection through one of wall of the monolithic shell is demonstrated.

In FIG. 10, an embodiment of a pipeline for molten sulfur composition transport is shown. A cross-section is shown for a long distance pipelining system to transport liquid sulfur compositions according the above inventions. In the prior art, it well known to use a "loop compensators" to accommodate thermal expansion and contraction of pipelines. The invention compensator eliminates high profile of the loop compensator requiring exposing the hot pipeline to the surface, preserves below ground safety and substantial decreases of heat losses. Central small diameter pipe (3), not exceeding 3 inch in diameter, is the conduit for hot liquids (1), is welded to collar (5) slides over a series of sealing rings. Collar (5) is welded at other end to the "belly" (harmonica) type compensator (4), which in turn is welded on the other end to the collar (6). Collar (6) is furnished with a protective cylindrical sheath covering and protecting the "belly" compensator from deformation. Central pipe (3) is protected from external forces and heat losses by external chamber (2) made by external pipe in which vacuum is maintained.

In FIG. 11, three embodiments are shown for a structural blanket of the invention sulfur matrix material. Such blankets protect slopes, water channels, and shores. The blankets can be quickly assembled to form roads in muddy terrain and to help reconstruct earth surfaces devastated by floods, erosion, ocean transgression, cliffs devastation, etc. The construction method is accomplished by forming a multi-block blanket in one continuous prefabricated form. In one preferred embodiment, the form can cover 50 square meters of earth surface. The invention matrix material is meltable and capable of being pumped into the prefabricated form, in which reinforcing wires or cables (1) are located. Criss-crossed wires or cables are cast into a body of each block of a special profile (3), which eliminates necessity of inserting cables into prefabricated holes as it is practiced in other methods. The polls (2) are used for stabilization of the blanket on steppe slopes. The openings created by geometry of blocks allows growth of plants (4), which provide additional subsurface stability.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:
1. A solid sulfur composition comprising:
   (a) elemental sulfur melted and combined with at least about 5 weight percent nucleating material comprising particles equal to or less than 150 microns in average diameter, the mixture thereafter subjected to at least a shear stress of above 5 kg per $m^2$ in a mixing chamber of a compounder at or above about 0.1 bars for at least a residence time of more than about 0.25 seconds, the mixture then being ejected from the mixing chamber and solidified into the solid sulfur composition.
2. The composition of claim 1 wherein the composition has a compressive strength of substantially greater than 5,000 psi.
3. The composition of claim 1 wherein the composition has a compressive strength of substantially greater than 8,000 psi.
4. The composition of claim 1 wherein the composition has a compressive strength of substantially greater than 10,000 psi.
5. The composition of claim 1 wherein the shear stress is above 100 kg per $m^2$.
6. The composition of claim 1 wherein the shear stress is above 200 kg per $m^2$.
7. The composition of claim 1 wherein the shear stress is above 400 kg per $m^2$.
8. The composition of claim 1 wherein nucleating material is particulate material not meltable at processing temperatures.
9. The composition of claim 1 wherein nucleating material is particulate material consisting of silica-derived materials, one or more metals, one or more metallic oxides, fly ash, slag, mineral composites, rock, mineral fibers, silica fibers, polymers that do not melt at processing temperatures within the mixing chamber, or salts.
10. A solid sulfur composition comprising:
    (a) elemental sulfur melted and combined fluid coalescing material, the mixture thereafter subjected to at least a shear stress of above 5 kg per $m^2$ in a mixing chamber at or above about 0.1 bars for at least a residence time of more than about 0.25 seconds, the mixture then being ejected from the mixing chamber and solidified into the solid sulfur composition.

11. The composition of claim 10 wherein the coalescing material is at least 3 weight percent liquid and non-gas forming at processing conditions and the composition has a compressive strength of substantially greater than 5,000 psi.

12. The composition of claim 10 wherein the coalescing material is at least 3 weight percent liquid and non-gas forming at processing conditions and the composition has a compressive strength of substantially greater than 8,000 psi.

13. The composition of claim 10 wherein the coalescing material is at least 3 weight percent liquid and non-gas forming at processing conditions and the composition has a compressive strength of substantially greater than 10,000 psi.

14. The composition of claim 10 wherein the coalescing material is gaseous or gas-forming at about at least 50 volume percent at processing conditions and the composition has a compressive strength of substantially greater than 5,000 psi where the shear stress is below about 200 kg per $m^2$.

15. The composition of claim 10 wherein the coalescing material is gaseous or gas-forming at processing conditions and the composition has a compressive strength of substantially less than 5,000 psi where the shear stress is above about 200 kg per $m^2$.

16. The composition of claim 15 wherein elemental sulfur mixed with meltable agricultural nutrient components to form a fertilizer carrier.

17. The composition of claim 16 wherein the meltable agricultural nutrient components are of one or more of the group consisting of phophates, urea, bentonite, and humic acid.

18. A method for forming a sulfur composition comprising:
 (a) elemental sulfur melted and combined fluid coalescing material and/or nucleating material, the mixture thereafter subjected to at least a shear stress of above 5 kg per $m^2$ in a mixing chamber of a compounder at or above about 0.1 bars for at least a residence time of more than about 0.25 seconds.

19. The method of claim 18 wherein the mixture then being ejected from the mixing chamber and solidified into the solid sulfur composition.

20. The method of claim 19 wherein the solid sulfur composition has a compressive strength of substantially greater than 5,000 psi.

* * * * *